US012767205B2

(12) United States Patent
Sasaki

(10) Patent No.: US 12,767,205 B2
(45) Date of Patent: Oct. 20, 2026

(54) STEERING WHEEL AND INFORMATION PRESENTER

(71) Applicant: SUBARU CORPORATION, Tokyo (JP)

(72) Inventor: Kou Sasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 41 days.

(21) Appl. No.: 18/888,569

(22) Filed: Sep. 18, 2024

(65) Prior Publication Data

US 2025/0108855 A1 Apr. 3, 2025

(30) Foreign Application Priority Data

Sep. 28, 2023 (JP) ................................ 2023-167706

(51) Int. Cl.
*B62D 1/06* (2006.01)
*B60Q 9/00* (2006.01)

(52) U.S. Cl.
CPC *B62D 1/06* (2013.01); *B60Q 9/00* (2013.01)

(58) Field of Classification Search
CPC ............. B62D 1/06; B62D 1/046; B60Q 9/00
See application file for complete search history.

(56) References Cited

U.S. PATENT DOCUMENTS

| | | | | |
|---|---|---|---|---|
| 11,325,634 | B1 * | 5/2022 | Szczerba | B60K 35/53 |
| 2012/0046833 | A1 | 2/2012 | Sanma et al. | |
| 2022/0410972 | A1 * | 12/2022 | Chang | B62D 15/029 |
| 2023/0163700 | A1 * | 5/2023 | Chang | H10N 30/857 310/309 |
| 2024/0087430 | A1 * | 3/2024 | Berry-Jones | B60Q 9/00 |

FOREIGN PATENT DOCUMENTS

| | | | | | |
|---|---|---|---|---|---|
| DE | 102019001389 | A1 * | 8/2019 | B62D 1/06 |
| JP | 2010269762 | A * | 12/2010 | |
| JP | 2012-62040 | A | 3/2012 | |
| JP | 2012062040 | A * | 3/2012 | B62D 1/046 |
| KR | 20180093302 | A * | 8/2018 | B62D 1/046 |

OTHER PUBLICATIONS

Wikipedia: "Steering Wheel". Downloaded Dec. 21, 2025 from The Wayback Machine, saved Aug. 7, 2023 (Year: 2023).*
Wikipedia: "Artificial Muscles". Downloaded Dec. 21, 2025 from The Wayback Machine, saved Mar. 22, 2023 (Year: 2023).*
Youtube video: "How It's Made—Steering Wheels" Panos Egglezos Feb. 18, 2012. 4:58 minutes. https://youtu.be/R_buXKxOf-Qg?si =SL2yxw4FGzxjMqCG (Year: 2012).*

(Continued)

*Primary Examiner* — Tyler D Paige
*Assistant Examiner* — Tanya C Sienko
(74) *Attorney, Agent, or Firm* — Rimon P.C.

(57) ABSTRACT

A steering wheel includes a rim configured to be gripped by a driver. The rim includes a core that serves as a frame of the rim, and a surface layer that covers the core. The rim includes a first region. The first region is disposed along all or a part of a circumference of the rim and includes an artificial muscle layer. The artificial muscle layer is disposed between the core and the surface layer and configured to expand and contract by energization.

2 Claims, 7 Drawing Sheets

(56) References Cited

OTHER PUBLICATIONS

Machine Translation of JP 2010269762 downloaded from Espacenet Dec. 21, 2025 (Year: 2025).*
Machine translation of DE 102019001389 A1 downloaded from IP.com May 21, 2026 (Year: 2026).*
Machine translation of KR 2018-0093302 A downloaded from IP.com May 21, 2026 (Year: 2026).*
Machine translation of Jp 2012062040A, downloaded off Espacenet Aug. 4, 2026 (Year: 2026).*

* cited by examiner

STEERING WHEEL AND INFORMATION PRESENTER

CROSS-REFERENCE TO RELATED APPLICATIONS

The present application claims priority from Japanese Patent Application No. 2023-167706 filed on Sep. 28, 2023, the entire contents of which are hereby incorporated by reference.

BACKGROUND

The disclosure relates to a steering wheel and an information presenter.

Proposals have been made for systems in which a steering wheel of a vehicle includes an artificial muscle. The artificial muscle is configured to expand and contract by energization. The systems are configured to transmit desired pieces of information from the steering wheel to a driver who drives the vehicle. For example, Japanese Unexamined Patent Application Publication (JP-A) No. 2010-269762 discloses a steering system in which a rim of a steering wheel includes a rim main body and artificial muscles disposed along the rim main body. The artificial muscles move away from the rim to define protrusions. The protrusions move along a circumference of the rim, around a rotation axis of the steering wheel. Moreover, distances from the rim main body to the artificial muscles change, which allows the protrusions to expand and contract radially of the rim. The steering system disclosed in JP-A No. 2010-269762 causes deformation of the steering wheel, to allow the driver who senses the deformation to understand information such as a direction of steering, an amount of steering, and steering timing, and thereby transmit the information to the driver.

JP-A No. 2012-62040 discloses an information presenter in which a wheel of a steering wheel includes a base, a movable unit, and an artificial muscle, i.e., a soft actuator. The movable unit moves relative to the base. The artificial muscle serves as a driving unit that drives the movable unit. The information presenter notifies a driver who drives a vehicle of a direction in which steering should be made, with a motion of the movable unit. The information presenter disclosed in JP-A No. 2012-62040 transmits assistance information necessary for driving of the vehicle to the driver who drives the vehicle.

SUMMARY

An aspect of the disclosure provides a steering wheel. The steering wheel includes a rim configured to be gripped by a driver. The rim includes: a core that serves as a frame of the rim; and a surface layer that covers the core. The rim includes a first region. The first region is disposed along all or a part of a circumference of the rim and includes an artificial muscle layer. The artificial muscle layer is disposed between the core and the surface layer, and configured to expand and contract by energization.

An aspect of the disclosure provides an information presenter. The information presenter is configured to present predetermined information to a driver who drives a vehicle, by using a steering wheel. The steering wheel includes a rim configured to be gripped by the driver. The information presenter includes: the steering wheel; and one or more processors. The steering wheel includes: a core that serves as a frame of the rim; a surface layer that covers the core; and an artificial muscle layer disposed between the core and the surface layer in a first region. The first region is disposed along all or a part of a circumference of the rim. The artificial muscle layer is configured to expand and contract by energization. The one or more processors are configured to control the energization of the artificial muscle layer. The one or more processors are configured to control the energization of the artificial muscle layer to change tactile sensation of the rim to be perceived by the driver, to present the predetermined information to the driver.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
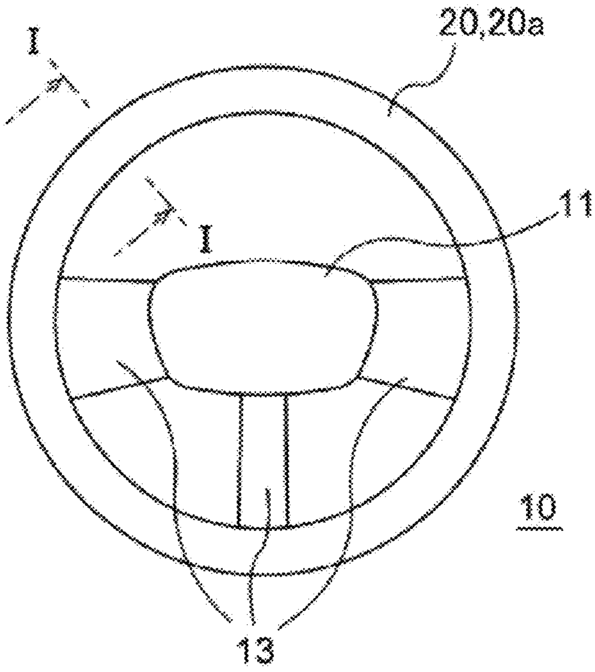
FIG. 1 is a schematic diagram of an overall configuration of a steering wheel according to an embodiment of the disclosure.

The steering wheels disclosed in JP-A Nos. 2010-269762 and 2012-62040 have the configuration in which the artificial muscle is disposed along a part of the rim. For example, the rim of the steering wheel includes a core serving as a frame and a surface layer covering the core. However, in the steering wheels disclosed in JP-A Nos. 2010-269762 and 2012-62040, the surface layer is disposed around the core, without the artificial muscle in between. That is, the steering wheels disclosed in JP-A Nos. 2010-269762 and 2012-62040 have the configuration in which, in a radial cross-section of the steering wheel, the artificial muscle is located around a part of an outer periphery of the rim.

Thus, the driver who drives the vehicle not only senses changes in the shape or the motion of the artificial muscle, but also directly senses vibrations transmitted from vehicle body side, as with existing steering wheels. Moreover, the steering wheels disclosed in JP-A Nos. 2010-269762 and 2012-62040 have the configuration in which an operation input of the steering wheel by the driver, i.e., a rotational operation, is directly transmitted from the steering wheel to a column shaft and a torsion bar. This makes it difficult to separate the operation input of the steering wheel from an inertia moment transmitted to the column shaft and the torsion bar. Accordingly, in the steering wheels disclosed in JP-A Nos. 2010-269762 and 2012-62040, it is difficult to control solely tactile sensation of the steering wheel.

It is desirable to provide a steering wheel and an information presenter that make it possible to control tactile sensation of a steering wheel to be perceived by a driver and expand a range of utilization of information transmission from the steering wheel to the driver.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

<1. Basic Configuration of Steering Wheel>

First, a basic configuration of a steering wheel according to an embodiment is described.

Figure 2:
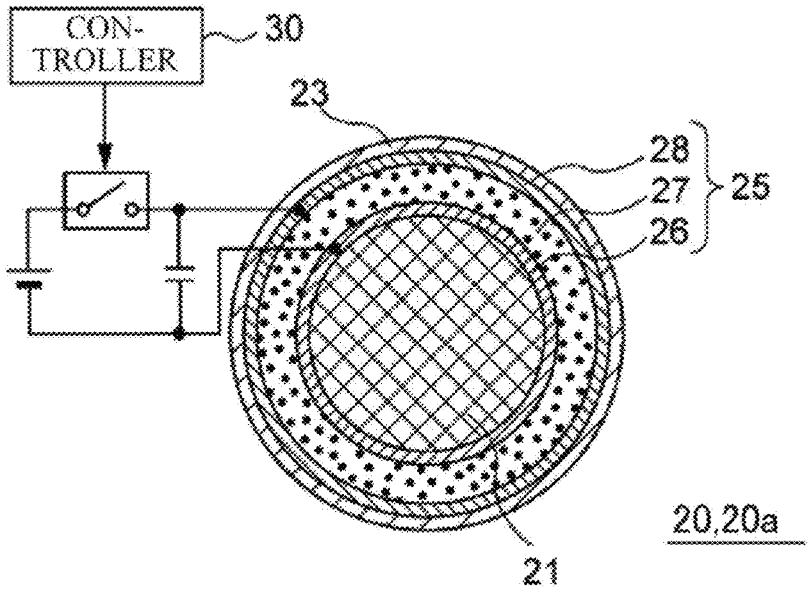
FIG. 2 describes a configuration of a first region of a rim of the steering wheel according to the embodiment.

FIGS. 1 and 2 describe the basic configuration of the steering wheel according to this embodiment. FIG. 1 illustrates a basic configuration of a steering wheel 10. FIG. 2 is a cross-sectional view of a first region 20*a* of a rim 20 of the steering wheel 10.

As illustrated in FIG. 1, the steering wheel 10 may include a hub 11, spokes 13, and the rim 20. The hub 11 is located at the center of the steering wheel 10 and coupled to a column shaft of a vehicle. The rim 20 is shaped as a ring and is configured to be gripped by a driver who drives the vehicle. The spokes 13 couple the hub 11 to the rim 20. On the hub 11, a horn and an airbag module may be disposed. On the spokes 13, various switches for audio and driver assistance such as automatic cruising may be disposed.

As illustrated in FIG. 2, the rim 20 includes a core 21, an artificial muscle layer 25, and a surface layer 23. The steering wheel 10 includes a first region 20*a* along all or a part of a circumference of the rim 20. In the first region 20*a*, the artificial muscle layer 25 is disposed between the core 21 and the surface layer 23. The steering wheel 10 illustrated in FIG. 1 may include the first region 20*a* along all of the circumference of the rim 20. Accordingly, the artificial muscle layer 25 may be disposed between the core 21 and the surface layer 23 along all of the circumference of the rim 20.

The core 21 serves as a frame of the rim 20. The core 21 may include a highly stiff material such as a metal. To the core 21, the spokes 13 may be coupled. The surface layer 23 covers the core 21 and may serve as an exterior of the rim 20. The surface layer 23 may include a sheet including a synthetic resin such as polyurethane, a synthetic leather, or a natural leather. The surface layer 23 may be disposed to encircle the core 21 and sewn together.

The artificial muscle layer 25 is configured to expand and contract by energization. In this embodiment, the artificial muscle layer 25 may include a first electrode 26, a dielectric 27, and a second electrode 28. The first region 20*a* may include the first electrode 26, the dielectric 27, and the second electrode 28 stacked in this order around the core 21. The dielectric 27 may include, for example, a dielectric elastomer including a polymer material. Applying a voltage to between the first electrode 26 and the second electrode 28 disposed with the dielectric 27 in between makes the dielectric 27 electrified and contract. The voltage to be applied to between the first electrode 26 and the second electrode 28 may be adjusted by a controller 30.

In this embodiment, applying the voltage to between the first electrode 26 and the second electrode 28 makes the dielectric 27 contract at least radially in the cross-section of the rim 20. Accordingly, the expansion and the contraction of the dielectric 27 causes at least a change in a thickness of the artificial muscle layer 25. As the voltage to be applied to the artificial muscle layer 25 becomes higher, a ratio of contraction of the dielectric 27 becomes higher, and the thickness of the artificial muscle layer 25 becomes smaller. The change in the thickness also depends on a degree of deformation of the surface layer 23, and may range from several micrometers inclusive to 1 millimeter exclusive.

Thus, stiffness of the dielectric 27 becomes higher, which allows the driver to sense that the rim 20 is relatively stiffer. In contrast, as the voltage to be applied to the artificial muscle layer 25 becomes lower, the ratio of contraction of the dielectric 27 becomes lower, and the thickness of the artificial muscle layer 25 becomes larger. Thus, the stiffness of the dielectric 27 becomes lower, which allows the driver to sense that the rim 20 is relatively softer.

It suffices that the artificial muscle layer 25 is disposed to allow for a control of transmission of a force, e.g., a moment or vibration, between the hand of the driver and the steering wheel 10. Accordingly, as illustrated in FIG. 1, the first region 20*a* in which the artificial muscle layer 25 is disposed does not have to be disposed along all of the circumference of the rim 20.

Figure 3:
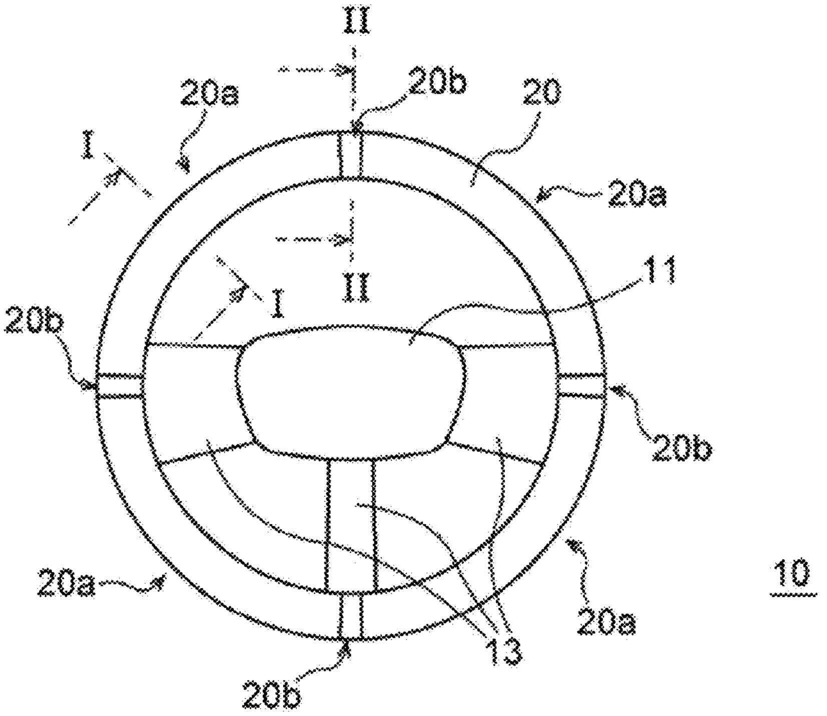
FIG. 3 is a schematic diagram of an overall configuration of a steering wheel according to a modification example of the embodiment.
Figure 4:
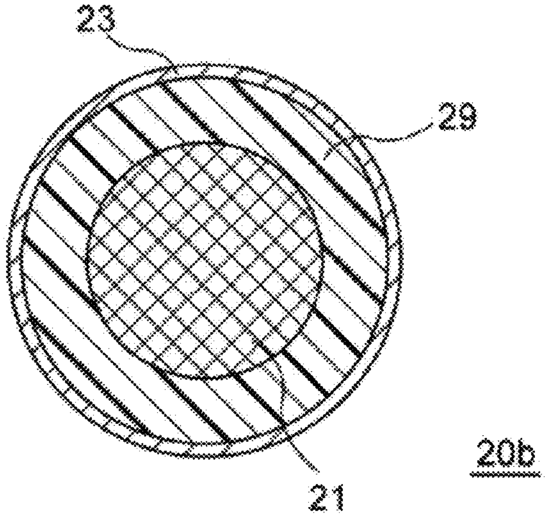
FIG. 4 describes a configuration of a second region of a rim of the steering wheel according to the modification example.

FIGS. 3 and 4 describe a modification example of the configuration of the steering wheel 10. FIG. 3 illustrates an overall configuration of the steering wheel 10 according to the modification example. FIG. 4 illustrates a cross-sectional view of a second region 20*b* of the rim 20 of the steering wheel 10.

As illustrated in FIG. 3, the steering wheel 10 may include a plurality of the first regions 20*a* and the second regions 20*b*. The plurality of the first regions 20*a* may be separated circumferentially of the rim 20. The second regions 20*b* may be disposed between the first regions 20*a* circumferentially adjacent to one another. The first regions 20*a* may have the configuration illustrated in the cross-sectional view in FIG. 2. The second regions 20*b* may include a buffer 29 between the core 21 and the surface layer 23.

The buffer 29 may include a material having lower stiffness than the stiffness of the dielectric 27 when the voltage is applied to the artificial muscle layer 25 in the first region 20*a*. For example, the buffer 29 may include an insulating material configured to maintain electric insulation between the first electrodes 26 of the circumferentially adjacent first regions 20*a*, or between the second electrodes 28 of the circumferentially adjacent first regions 20*a*. For example, the buffer 29 may include a cushioning insulator such as urethane foam.

When voltage application to the artificial muscle layer 25 in the first region 20*a* causes a change in a circumferential length of the artificial muscle layer 25, the second region 20*b* including the buffer 29 is compressed by the circumferential expansion of the artificial muscle layer 25. Thus, the second region 20*b* including the buffer 29 is configured to maintain a total circumferential length of the dielectric 27 and the buffer 29 disposed between the core 21 and the surface layer 23. Thus, on the occasion of the contraction of the dielectric 27 by the voltage application to the artificial muscle layer 25, it is possible to suppress deformation such as undulation of the artificial muscle layer 25 caused by the circumferential expansion of the dielectric 27 on whichever of the first electrode 26 and the second electrode 28 serves as a positive electrode. Hence, it is possible to make it easier for the driver to sense a change in tactile sensation of the rim 20.

Moreover, circumferentially separating the first regions 20*a* from one another makes it possible to select one of the first regions 20*a* in which the voltage is to be applied to the artificial muscle layer 25. Hence, it is possible to diversify a method to present information to the driver through the steering wheel 10. Detailed description is given later of examples of information presentation by using the circumferentially separated first regions 20*a*.

A circumferential length of the second region 20*b* between the circumferentially adjacent first regions 20*a* may be smaller than, for example, 10 mm. Hence, in consideration of the size of the human fingers, it is possible to suppress the driver from sensing the vibration of the core 21 without through the artificial muscle layer 25.

Figure 5:
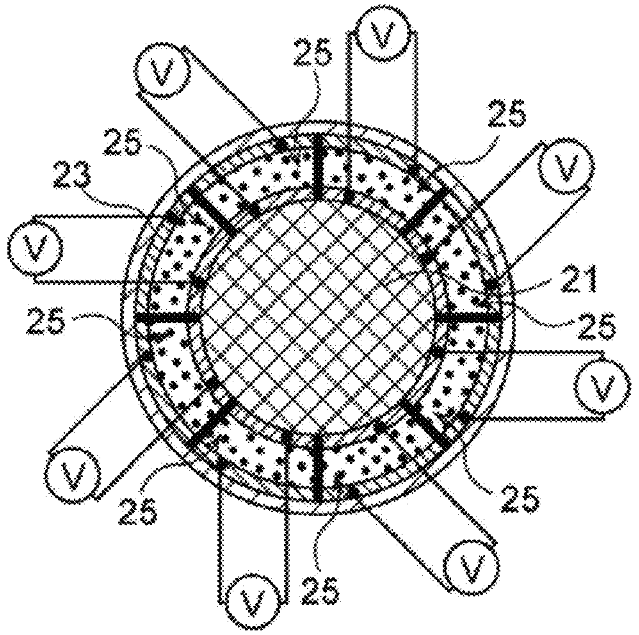
FIG. 5 is a schematic diagram of a modification example of the first region of the rim of the steering wheel according to the embodiment.

FIG. 5 describes a modification example of the configuration of the first region 20*a*. FIG. 5 is a cross-sectional view of the first region 20*a*. As illustrated in FIG. 5, the artificial muscle layer 25 of the first region 20*a* may be separated into a plurality axially of the core 21. Such a configuration makes it possible to increase a range of reduction in the thickness on the occasion of the contraction of the artificial muscle layer 25 by the voltage application to the artificial muscle layer 25. Hence, it is possible to make it easier for the driver to sense the change in the tactile sensation of the rim 20.

The configuration of the first region 20*a* illustrated in FIG. 5 may be applied to the first region 20*a* of the steering wheel 10 as illustrated in FIG. 1. Alternatively, the configuration of the first region 20*a* illustrated in FIG. 5 may be applied to the first region 20*a* of the steering wheel 10 as illustrated in FIG. 3.

<2. Information Presenter>

With the steering wheel 10 according to this embodiment, it is possible to control the tactile sensation of the rim 20 to be perceived by the driver, by the voltage to be applied to the artificial muscle layer 25. In the following, description is given of an example of an information presenter including the steering wheel 10 according to this embodiment.

Figure 6:
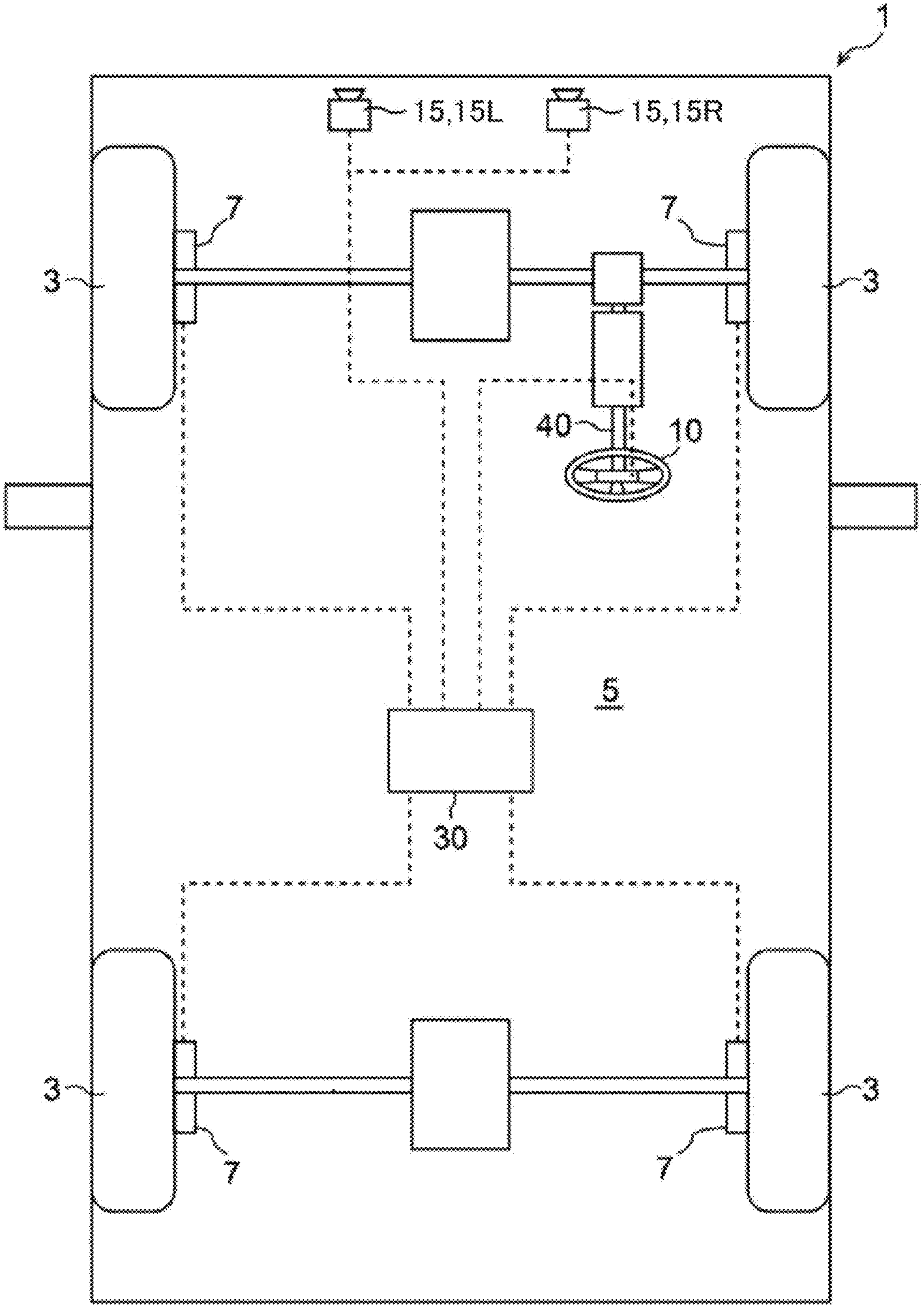
FIG. 6 describes a configuration example of a vehicle including an information presenter according to the embodiment.

FIG. 6 illustrates a configuration example of a vehicle 1 including an information presenter 5. The information presenter 5 is configured to carry out presentation processing of a road surface friction state. The vehicle 1 may include a detector or an estimator of a friction state of a traveled road surface. In the example illustrated in FIG. 6, as the estimators of the road surface friction coefficient, hub sensors 7, i.e., tire force sensors, may be provided. The hub sensors 7 may include tire force sensors attached to axles of the front right wheel 3, the front left wheel 3, the rear right wheel 3, and the rear left wheel 3 of the vehicle 1. The hub sensors 7 may detect loads to be applied in three axial directions along a longitudinal direction, i.e., an X direction, a vehicle widthwise direction, i.e., a Y direction, and a heightwise direction, i.e., a Z direction, of a vehicle body, and moments generated around the three axes.

The vehicle 1 may further include a surrounding environment sensor 15. The surrounding environment sensor 15 may include one or more sensors configured to detect data regarding surrounding environment of the vehicle 1. The surrounding environment sensor 15 may detect, for example, obstacles such as other vehicles and pedestrians, road shapes, positions of, for example, lane lines of a travel lane, distances, and speeds. The surrounding environment sensor 15 may output data regarding detection results to the controller 30. The surrounding environment sensor 15 may include, for example, any one or more sensors out of a camera, LiDAR, a radar sensor, and an ultrasonic sensor. The vehicle 1 illustrated in FIG. 6 may include, as the surrounding environment sensor 15, a pair of right and left stereo cameras 15R and 15L. The stereo cameras 15R and 15L may capture frontward images of the vehicle 1.

The controller 30 may control the energization of the artificial muscle layer 25 of the steering wheel 10. The controller 30 may include a processor such as one or more CPUs (Central Processing Units) executing a computer program to control the voltage to be applied to the artificial muscle layer 25 and present information to the driver. The computer program is a computer program that causes the processor to execute operation described later to be carried out by the controller 30. The computer program to be executed by the processor may be held in a recording medium that serves as a storage, or a memory, included in the controller 30. Alternatively, the computer program to be executed by the processor may be held in a recording medium built in the controller 30 or in any recording medium externally attachable to the controller 30.

The recording medium configured to hold the computer program may include, for example, a magnetic medium such as a hard disk, a floppy disk and a magnetic tape, an optical recording medium such as a CD-ROM (Compact Disc Read Only Memory), a DVD (Digital Versatile Disc), and a Blu-ray (registered trademark), a magneto-optical medium such as a floptical disk, a storage device such as a RAM and a ROM, and a flash memory such as a USB (Universal Serial Bus) memory and an SSD (Solid State Drive), or other media configured to hold programs.

(2-1. Notification Processing)

A first use example of the information presenter 5 is notification processing, i.e., a mode including detecting a predetermined notification target and allowing the driver to recognize the detection of the notification target through the tactile sensation of the rim 20 of the steering wheel 10. There are no particular limitations on the notification target. Non-limiting examples of the notification target may include an obstacle approaching, presence of a blind spot, deviation from a travel lane, and colors of traffic lights. Moreover, a known method may be used as the detection method of the notification target.

In the notification processing, the controller 30 may adjust the voltage to be applied to the artificial muscle layer 25 when the notification target is detected based on measurement data by the surrounding environment sensor 15 mounted on the vehicle 1 or data transmitted from an external device through wireless communication such as mobile communication. Thus, unlike the method of applying vibration to the steering wheel 10, it is possible to give a static notification or a static alarm. For example, the controller 30 may increase hardness of the tactile sensation of the rim 20 of the steering wheel 10 to allow the driver to sense as if the vehicle itself were tensed up.

In this case, for example, in a normal state in which no notification targets are detected, the controller 30 may set the voltage to be applied to the artificial muscle layer 25, to a predetermined basic voltage value. As a risk level or an urgency level of the notification target becomes higher, the controller 30 may raise the voltage to be applied. This makes it possible to prevent the driver from feeling uncomfortable with respect to a steering operation in a normal driving state in which no notification targets are detected. Moreover, as the risk level or the urgency level of the notification target becomes higher, the controller 30 may raise the voltage to be applied, from the predetermined basic voltage value, thereby increasing the hardness of the tactile sensation of the rim 20 of the steering wheel 10. Hence, it is possible to alert the driver to, for example, collision.

(2-2. Presentation Processing of Road Surface Friction State)

A second use example of the information presenter 5 may be the presentation processing of the road surface friction state, i.e., a mode including presenting the driver with the friction state of the road surface traveled by the vehicle 1.

A reaction force generated in the tire from the traveled road surface influences shear deformation of tread rubber on a grounding surface of a tire, causing a change in grounding area of the tire. Moreover, the reaction force generated in the tire from the traveled road surface influences a dynamic friction force in the grounding surface of the tire, causing a change in sliding area of the tire. The dynamic friction force is a multiplication of a dynamic friction coefficient by a grounding reaction force. That is, because the reaction force generated in the tire from the traveled road surface is a force generated by the static deformation and a friction force, it is difficult for the driver to intuitively understand the physical phenomenon even if the road surface friction state is presented to the driver by, for example, simply applying vibration to the steering wheel.

In contrast, by using the information presenter 5 in this embodiment, it is possible to intuitively transmit the static reaction force generated in the tread rubber to the driver as the reaction force of the surface of the rim 20 of the steering wheel 10.

The controller 30 may estimate the road surface friction coefficient based on the steering wheel angle of the steering wheel 10 or a steering angle of steered wheels, the speed of the vehicle 1, and the loads and the moments to be outputted from the hub sensors 7. A known method may be used as the method of estimating the road surface friction coefficient using the hub sensors 7. It is to be noted that the method of estimating the road surface friction coefficient of the traveled road surface is not limited to the example using the hub sensors 7. Any other methods may be used, e.g., a method of estimating the road surface friction coefficient based on a slip angle of the tire with respect to a direction of advance of the vehicle body or a method of estimating the road surface friction coefficient based on a road surface state detected based on image data captured by an infrared camera.

The controller 30 may apply the voltage corresponding to the estimated road surface friction coefficient to the artificial muscle layer 25. For example, as the road surface friction coefficient becomes lower, the controller 30 may lower the voltage to be applied, from the predetermined basic voltage value, and decrease the hardness of the tactile sensation of the rim 20 of the steering wheel 10. Accordingly, in a situation in which the road surface friction coefficient of the traveled road surface is small and the road surface is slippery, it is possible to give the driver the sense that the reaction force is lowering with respect to an operation of the steering wheel 10, and give the driver the "sense of slipperiness" or the "sense of minimal resistance". Hence, it is possible to alert the driver to a slip.

Figure 7:
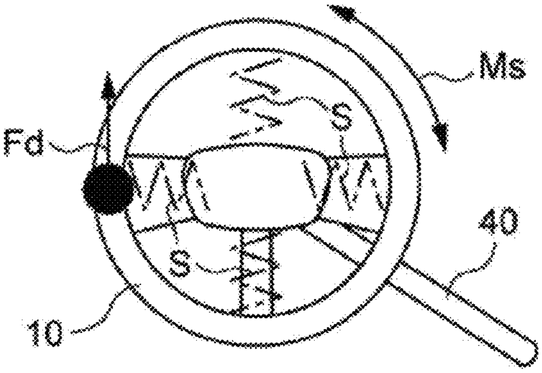
FIG. 7 describes workings of the steering wheel according to the embodiment.
Figure 8:
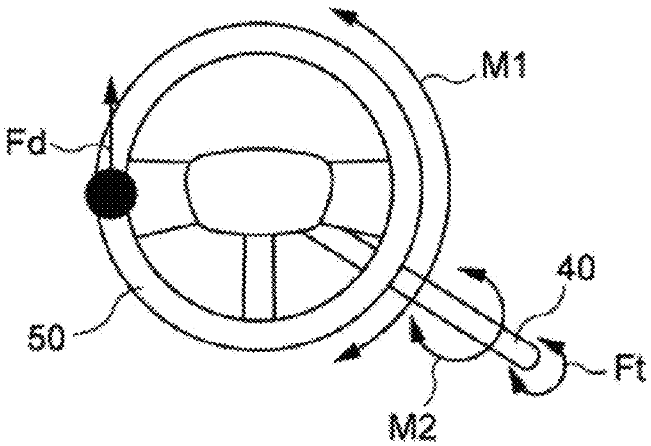
FIG. 8 describes workings of an existing steering wheel.

FIGS. 7 and 8 describe moments to be generated in a column shaft 40 by an operation input by the driver, with respect to the steering wheel 10 of this embodiment and a steering wheel 50 according to a reference example devoid of the first region 20*a*.

At a place where the traveled road surface is slippery, that is, where the road surface friction coefficient is suspected to be small, the driver who is driving the vehicle 1 unconsciously makes a steering operation with a small steering angle to check magnitude of a steering reaction force transmitted through the column shaft and the steering wheel. The steering reaction force reflects resistance of the grounding surface of the tire with respect to the road surface, or a cornering force.

In the reference example illustrated in FIG. 8, an operation input Fd by the driver causes generation of the steering reaction force that is a sum of an inertial moment M1 of the steering wheel 50, an inertial moment M2 of the column shaft 40, and a torsional reaction force Ft of a torsion bar. That is, in the reference example, when the driver starts turning the steering wheel 50, the driver senses the two inertial moments M1 and M2, and the torsional torque of the torsion bar proportional to the cornering force, as the steering reaction force in an initial stage of steering. Accordingly, it is difficult to make the steering reaction force to be sensed by the driver smaller than the steering reaction force described above, and there is a limit to giving the driver the sense that the steering reaction force is minute, and alerting the driver.

In contrast, in this embodiment illustrated in FIG. 7, the artificial muscle layer 25 is interposed between the surface layer 23 the driver directly touches and the core 21. By the stiffness of the artificial muscle layer 25, it is possible to freely adjust a degree of transmission of the force between the surface layer 23 and the core 21. Accordingly, stopping the voltage application to the artificial muscle layer 25 and lowering the stiffness of the artificial muscle layer 25 make it possible to reduce an apparent spring constant of the artificial muscle layer 25. As a result, the steering reaction force caused by the operation input Fd by the driver at the start of turning of the steering wheel 10 becomes only an inertial moment Ms of the surface layer 23 of the steering wheel 10. This makes it possible to realize the minute steering reaction force irreproducible by an existing steering wheel. Hence, it is possible to give the driver the "strong sense of slipperiness" or the "strong sense of minimal resistance" and to alert the driver. Because humans sensitively sense an angle change in a minute steering angle range of 1 degree or less, this embodiment is particularly effective in the minute steering angle range.

<3. Operation of Information Presenter>

Description now moves on to an example of processing operation by the controller 30 of the information presenter 5 according to this embodiment.

Figure 9:
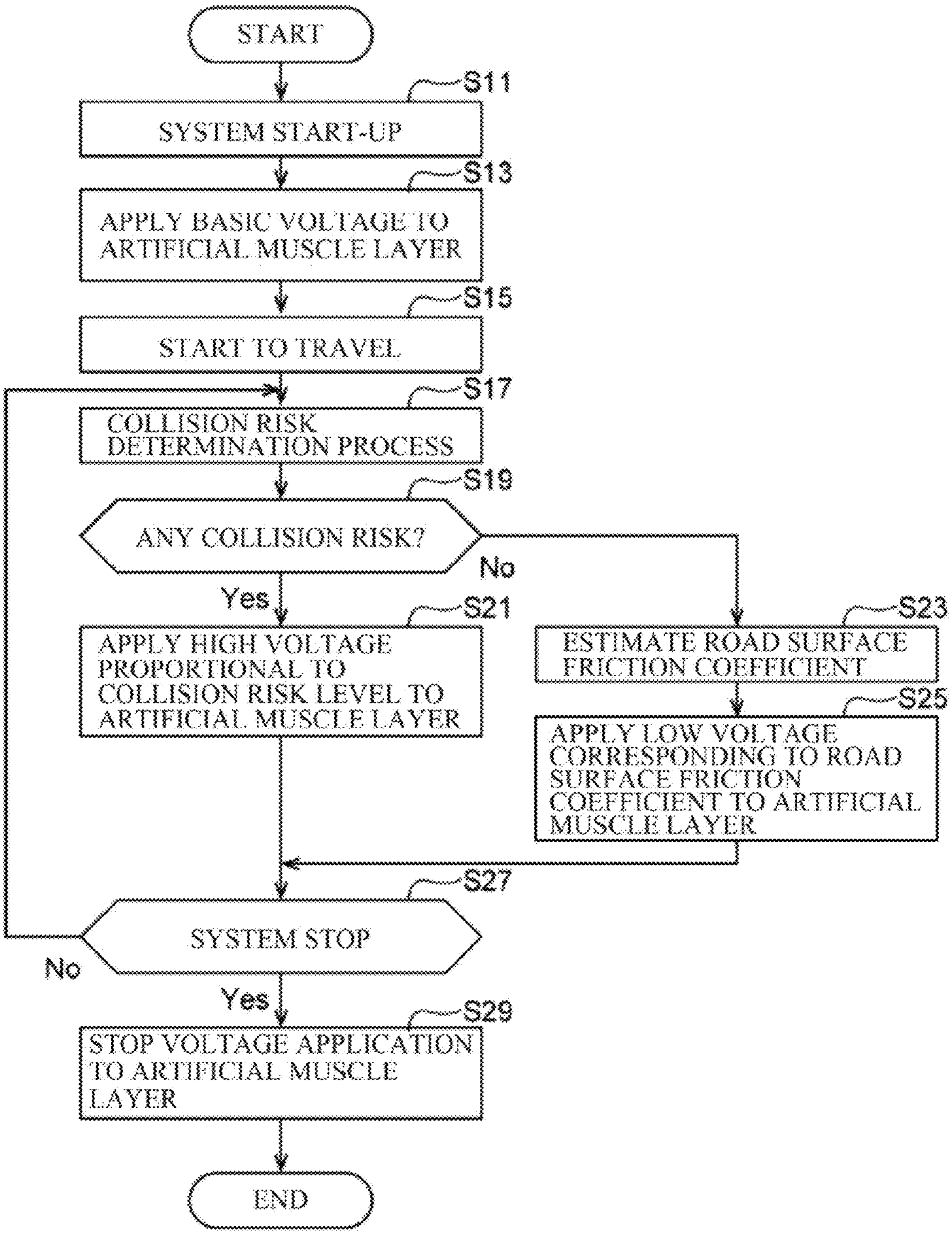
FIG. 9 is a flowchart of information presentation processing by a controller of the information presenter according to the embodiment.

FIG. 9 is a flowchart of information presentation processing by the controller 30.

Sensing a start-up of a system of the vehicle 1 (step S11), the controller 30 may apply the predetermined basic voltage to the artificial muscle layer 25 (step S13). The basic voltage may be set to any value. This makes the hardness of the tactile sensation of the rim 20 of the steering wheel 10 to be set to any initial state.

Thereafter, sensing a start of travel of the vehicle 1 (step S15), the controller 30 may carry out a process to determine a collision risk of the vehicle 1 (step S17). The process to determine the collision risk may be carried out by using existing various techniques. Thus, a collision risk level between the vehicle 1 and an obstacle may be determined. For example, the controller 30 may carry out a known process of risk potential calculation based on the measurement data outputted from the surrounding environment sensor 15, to determine the collision risk level, i.e., a risk value of collision between the vehicle 1 and an obstacle such as a random vehicle, a pedestrian, or a building.

Thereafter, based on a result of the process to determine the collision risk, the controller 30 may determine presence or absence of the collision risk between the vehicle 1 and the obstacle (step S19). For example, the controller 30 may determine whether the risk value determined is larger than a predetermined reference value. When determining the presence of the collision risk between the vehicle 1 and the obstacle (step S19/Yes), the controller 30 may apply a high voltage proportional to the collision risk level to the artificial muscle layer 25 (step S21). In other words, the controller 30 may raise the voltage to be applied to the artificial muscle layer 25, from the basic voltage in accordance with the collision risk level. Thus, as the collision risk becomes higher, the hardness of the tactile sensation of the rim 20 of the steering wheel 10 becomes larger than the initial state. Hence, it is possible to give an intuitional alert to the driver.

When not determining the presence of the collision risk between the vehicle 1 and the obstacle (step S19/No), the controller 30 may carry out a process to estimate the road surface friction coefficient (step S23). In the example of the vehicle 1 illustrated in FIG. 6, the controller 30 may obtain the slip angle or a slip ratio of the tire with respect to the direction of advance of the vehicle body, based on the steering wheel angle of the steering wheel 10, or the steering angle of the steered wheels, the speed of the vehicle 1, and the loads or the moments outputted from the hub sensors 7. Moreover, the controller 30 may estimate the road surface friction coefficient based on the cornering force and the slip angle, or based on a driving force of the vehicle 1 and the slip ratio. However, there are no particular limitations on the estimation method of the road surface friction coefficient. The controller 30 may adopt, as the road surface friction coefficient, an average value of the road surface friction coefficients estimated for the respective wheels 3, i.e., the front right wheel, the front left wheel, the rear right wheel, and the rear left wheel. Alternatively, the controller 30 may adopt, as the road surface friction coefficient, a maximum value of the road surface friction coefficients estimated for the respective wheels 3, i.e., the front right wheel, the front left wheel, the rear right wheel, and the rear left wheel.

Thereafter, the controller 30 may apply a low voltage corresponding to the road surface friction coefficient to the artificial muscle layer 25 (step S25). In other words, the controller 30 may lower the voltage to be applied to the artificial muscle layer 25, from the basic voltage in accordance with the low road surface friction coefficient. Thus, as the road surface friction coefficient becomes lower, i.e., as the traveled road surface is slippery, softness of the tactile sensation of the rim 20 of the steering wheel 10 becomes higher. This gives the driver the "sense of slipperiness", or the "sense of minimal resistance", making it possible to give an intuitional alert to the driver.

Table 1 summarizes setting examples of the voltage to be applied.

TABLE 1

| Estimated Value of Road Surface Friction Coefficient | Degree of Contraction of Artificial Muscle Layer | Stiffness Value of Artificial Muscle Layer | Applied Voltage to Artificial Muscle Layer |
|---|---|---|---|
| All | Maximum | Maximum Value | Maximum Value |
| . . . | ↓ | ↓ | ↓ |
| 1.0 | Initial State | Initial Value | Basic Voltage |
| . . . | ↓ | ↓ | ↓ |
| 0.5 | Medium between Initial State and Minimum | Medium between Initial Value and Minimum Value | Half Basic Voltage |
| . . . | ↓ | ↓ | ↓ |
| 0.1 | Minimum | Minimum Value | 0 |

For example, in step S17, the controller 30 may calculate the collision risk level as the risk value ranging from 0 to 1.0 both inclusive. Moreover, in step S19, when the risk value is larger than 0.3, the controller 30 may determine the presence of the collision risk. Thus, in step S21, the controller 30 may assume, as the basic voltage, the applied voltage when the risk value is 0.3, assume, as the maximum voltage, the applied voltage when the risk value is 1.0, set the applied voltage to the artificial muscle layer 25 in proportion to the risk value, and raise the applied voltage from the basic voltage regardless of the road surface friction coefficient.

Instead of setting the applied voltage to the artificial muscle layer 25 in proportion to the risk value, the controller 30 may set the applied voltage constantly to the maximum value when the collision risk is present.

Moreover, in step S23, the controller 30 may calculate the road surface friction coefficient as a value ranging from 0 to 1.0 both inclusive. Furthermore, in step S23, the controller 30 may determine that the road surface friction state is "small" when the road surface friction coefficient ranges from 0 exclusive to 0.1 inclusive; determine that the road surface friction state is "medium" when the road surface friction coefficient ranges from 0.1 exclusive to 0.5 inclusive; and determine that the road surface friction state is "large" when the road surface friction coefficient ranges from 0.5 exclusive to 1.0 inclusive. Thus, the controller 30 may set the applied voltage to the artificial muscle layer 25 to either "the basic voltage", "half the basic voltage", or "0", and apply the voltage to the artificial muscle layer 25, to allow the artificial muscle layer 25 to exhibit the stiffness value in accordance with the road surface friction states, i.e., "large", "medium", and "small".

In the example summarized in Table 1, the voltage to be applied to the artificial muscle layer 25 in accordance with the road surface friction coefficient is set in three stages. However, the voltage to be applied to the artificial muscle layer 25 may be set in four or more stages, or alternatively, the voltage to be applied to the artificial muscle layer 25 may be set linearly in accordance with the road surface friction coefficient.

Figure 10:
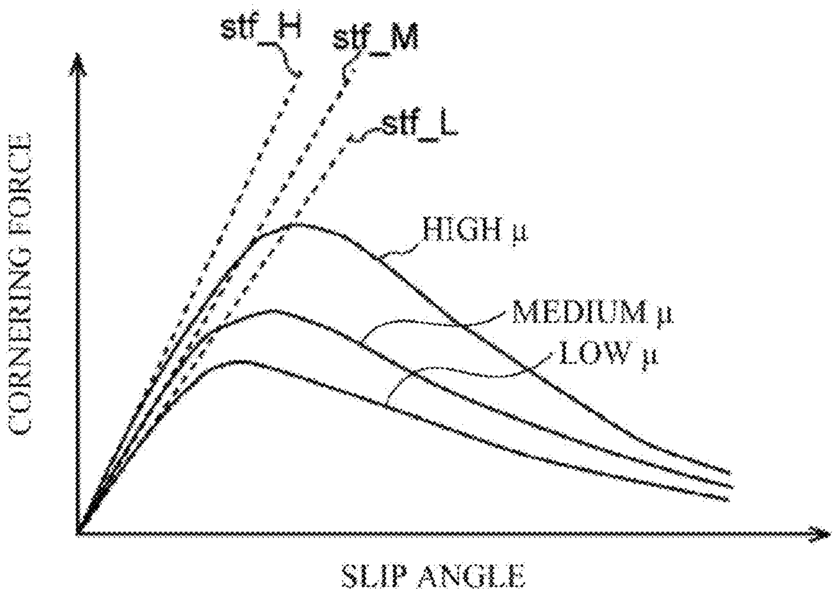
FIG. 10 describes a setting example of a stiffness value of an artificial muscle layer in accordance with a road surface friction state by the controller of the information presenter according to the embodiment.
Figure 11:
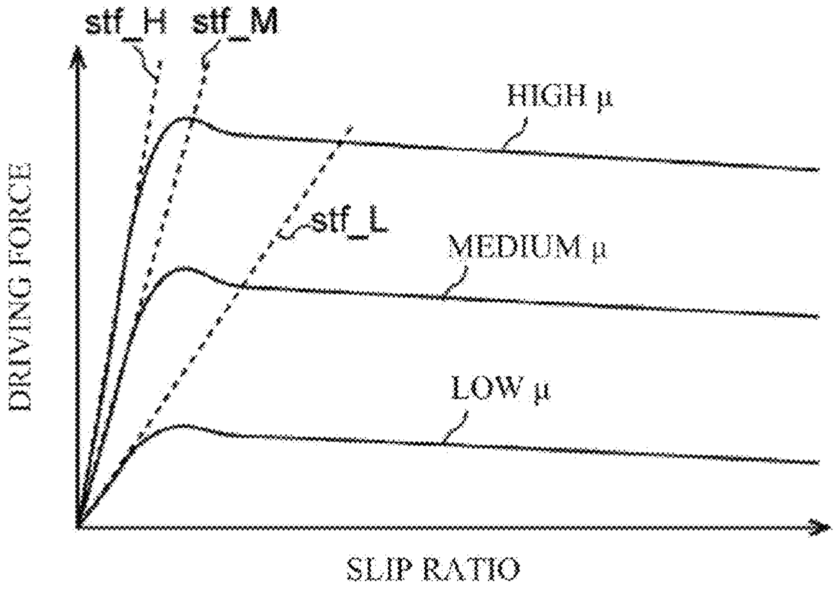
FIG. 11 describes another setting example of the stiffness value of the artificial muscle layer in accordance with the road surface friction state by the controller of the information presenter according to the embodiment.

Moreover, as illustrated in FIG. 10, the controller 30 may change the stiffness values stf_H, stf_M, and stf_L of the artificial muscle layer 25 in proportion to an inclination of a change in the cornering force with respect to the slip angle. The cornering force changes with the road surface friction coefficients high u, medium u, and low u. Alternatively, as illustrated in FIG. 11, the controller 30 may change the stiffness values stf_H, stf_M, and stf_L of the artificial muscle layer 25 in proportion to an inclination of a change in the driving force with respect to the slip ratio. The driving force changes with the road surface friction coefficients, e.g., high u, medium u, and low u. By controlling the hardness of the tactile sensation of the steering wheel 10 in this way, it is possible to intuitively transmit a more detailed road surface friction state to the driver.

Back to FIG. 9, after applying the predetermined voltage to the artificial muscle layer 25 in step S21 or S25, the controller 30 may determine whether the system of the vehicle 1 has stopped (step S27). When the controller 30 does not determine that the system has stopped (step S27/No), the flow may be caused to return to step S17, and repeat the control of the voltage to be applied to the artificial muscle layer 25 based on the collision risk or the road surface friction coefficient. When the controller 30 determines that system has stopped (step S27/Yes), the controller 30 may stop the voltage application to the artificial muscle layer 25 (step S29), and end the presentation processing of the road surface friction state.

As described, in the information presenter 5 of this embodiment, as the collision risk becomes higher, the controller 30 is configured to increase the hardness of the tactile sensation of the rim 20 of the steering wheel 10, making it possible to allow the driver to sense as if the vehicle itself were tensed up. This makes it possible to alert the driver to, for example, collision. Moreover, as the road surface friction coefficient of the traveled road surface becomes smaller, the controller 30 is configured to increase the softness of the tactile sensation of the rim 20 of the steering wheel 10 and reduce the steering reaction force in response to the operation input by the driver. This makes it possible to give the driver the "sense of slipperiness" or the "sense of minimal resistance" and give an intuitive alert.

Furthermore, in the information presenter 5 of this embodiment, as illustrated in FIG. 3, the first region 20*a* of the steering wheel 10 may be separated circumferentially. The first regions 20*a* may be associated with respective ones of the front right wheel 3, the front left wheel 3, the rear right wheel 3, and the rear left wheel 3. For example, let us assume that, when the steering wheel 10 takes a posture in which the vehicle 1 assumes a straight travel state, a top of the steering wheel 10 is at 0 degrees. In this case, the second regions 20*b* may be provided at positions of, at least, 0 degrees, 90 degrees, 180 degrees, and 270 degrees clockwise. The first regions 20*a* within ranges of 0 to 90 degrees, 90 to 180 degrees, 180 to 270 degrees, and 270 to 360 degrees may be respectively associated with the front right wheel, the rear right wheel, the rear left wheel, and the front left wheel.

In this case, the controller 30 may acquire data regarding a position of an obstacle having possibility of collision, and control the energization of the artificial muscle layer 25 in the first region 20*a* corresponding to the position of the obstacle with respect to the vehicle 1. This makes it possible for the driver to intuitively recognize a direction in which the collision risk is present with respect to the vehicle 1, while making the driving operation of the vehicle 1, and take a driving action to avoid the collision of the vehicle 1. Moreover, the controller 30 may acquire data regarding the friction state of the traveled road surface for each of the wheels 3, and control the energization of the artificial muscle layers 25 in the first regions 20*a* associated with the respective wheels 3. This makes it possible for the driver to intuitively recognize which of the wheels 3 is about to slip, while making the driving operation of the vehicle 1, and take a driving action to avoid a slip of the vehicle 1.

<4. Other Examples of Presentation Processing>

The information presenter of this embodiment is applicable to other than the use examples described above.

For example, by adjusting the hardness of the tactile sensation of the steering wheel 10, vibration of the steering wheel 10 caused by unevenness of the road surface may be adjusted. The vibration of the steering wheel 10 is inputted through the tire in contact with the traveled road surface. This makes it possible to adjust a degree of transmission of the vibration caused by the unevenness of the road surface and transmitted to the driver.

In addition, by adjusting the hardness of the tactile sensation of the steering wheel 10, the spring constant between the hand of the driver operating the steering wheel 10 and the core 21 of the steering wheel 10 may be adjusted. This makes it possible to adjust responsiveness to a change in the steering angle of the wheels 3 caused by the operation input to the steering wheel 10 by the driver.

As described, in the steering wheel and the information presenter of this embodiment, it is possible to control the tactile sensation of the steering wheel to be perceived by the driver, leading to expansion of a range of utilization of information transmission from the steering wheel to the driver. Moreover, in the steering wheel of this embodiment, it is possible to freely adjust a degree of transmission or transmission efficiency of a force between the hand of the driver and the core of the steering wheel. Hence, it is possible to intuitively present various kinds of information to the driver.

Furthermore, in the steering wheel and the information presenter of this embodiment, it is possible to freely adjust the degree of transmission or the transmission efficiency of the force between the hand of the driver and the core of the steering wheel. This makes it possible to adjust the vibration caused by the unevenness of the road surface and transmitted from the wheel to the hand of the driver, and adjust the responsiveness to the operation input to the steering wheel by the driver. Hence, it is also possible to adjust driving characteristics of the vehicle.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. Moreover, the disclosure is also intended to include combinations of the forgoing embodiments and the forgoing modification examples in so far as they fall within the scope of the appended claims or the equivalents thereof.

For example, in the example illustrated in FIG. 3, the first region 20*a* includes the artificial muscle layer 25, and the second region 20*b* includes no artificial muscle layer. However, the configuration of separating the first regions 20*a* circumferentially of the rim 20 is not limited to this example. For example, in an alternative configuration, the second region 20*b* may include the dielectric 27, without the first electrode 26 and the second electrode 28. With such a configuration, it is also possible to selectively change the hardness of the tactile sensation of the first region 20*a*.

As used herein, the term "collision" may be used interchangeably with the term "contact".

The controller 30 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 30 illustrated in FIG. 2.

The invention claimed is:

1. A steering wheel comprising a rim configured to be gripped by a driver, the rim comprising:

a core that serves as a frame of the rim; and a surface layer that covers the core, the rim comprising a first region, the first region being disposed along all or a part of a circumference of the rim and comprising an artificial muscle layer, the artificial muscle layer being disposed between the core and the surface layer, and configured to expand and contract by energization, wherein the artificial muscle layer comprises:

a first electrode;

a dielectric configured to expand and contract by the energization; and a second electrode, wherein the first region comprises the first electrode, the dielectric, the second electrode, and the surface layer stacked in order around the core, wherein expanding and contracting the dielectric by the energization causes a change in at least a thickness of the artificial muscle layer, wherein the steering wheel comprises:

first regions comprising the first region separated circumferentially of the rim; and second regions disposed between the first regions circumferentially adjacent to one another, wherein the expanding and contracting the dielectric by the energization further causes a change in a circumferential length of the artificial muscle layer, and wherein the second regions comprise a buffer configured to be compressed by circumferential extension of the artificial muscle layer.

2. An information presenter configured to present predetermined information to a driver who drives a vehicle, by using a steering wheel, the steering wheel comprising a rim configured to be gripped by the driver, and the information presenter comprising:

the steering wheel; and one or more processors, the steering wheel comprising:

a core that serves as a frame of the rim;

a surface layer that covers the core; and an artificial muscle layer disposed between the core and the surface layer in a first region, the first region being disposed along all or a part of a circumference of the rim, and the artificial muscle layer being configured to expand and contract by energization, wherein the artificial muscle layer comprises:

a first electrode;

a dielectric configured to expand and contract by the energization; and a second electrode, wherein the first region comprises the first electrode, the dielectric, the second electrode, and the surface layer stacked in order around the core, the one or more processors being configured to control the energization of the artificial muscle layer, wherein the one or more processors are configured to control the energization of the artificial muscle layer to change tactile sensation of the rim to be perceived by the driver, to present the predetermined information to the driver, wherein the steering wheel comprises:

first regions comprising the first region separated circumferentially of the rim; and second regions disposed between the first regions circumferentially adjacent to one another, wherein the expanding and contracting the dielectric by the energization further causes a change in a circumferential length of the artificial muscle layer, and wherein the second regions comprise a buffer configured to be compressed by circumferential extension of the artificial muscle layer.

* * * * *